United States Patent
Noyel et al.

(10) Patent No.: US 9,002,130 B2
(45) Date of Patent: Apr. 7, 2015

(54) METHOD FOR DETERMINING ELEMENTS IN RELIEF ON THE SURFACE OF A TYRE

(75) Inventors: Guillaume Noyel, Clermont-Ferrand Cedex 9 (FR); Jean-Paul Zanella, Clermont-Ferrand Cedex 9 (FR); Alexandre Joly, Clermont-Ferrand Cedex 9 (FR)

(73) Assignees: Compagnie Generale des Etablissments Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/118,598

(22) PCT Filed: May 10, 2012

(86) PCT No.: PCT/EP2012/058605
§ 371 (c)(1),
(2), (4) Date: Mar. 14, 2014

(87) PCT Pub. No.: WO2012/156260
PCT Pub. Date: Nov. 22, 2012

(65) Prior Publication Data
US 2015/0043780 A1    Feb. 12, 2015

(30) Foreign Application Priority Data
May 19, 2011    (FR) ...................................... 11 54346

(51) Int. Cl.
*G06K 9/40*    (2006.01)
*G06K 9/00*    (2006.01)
(Continued)

(52) U.S. Cl.
CPC ........... *G01M 17/027* (2013.01); *G06T 7/0004* (2013.01); *G06T 7/0079* (2013.01); *G06T 2207/20036* (2013.01); *G06T 2207/30108* (2013.01)

(58) Field of Classification Search
CPC .. G06K 9/6204; G06K 9/6206; G06T 3/0068; G06T 3/0056; G06T 7/003; G06T 2207/10028; G06T 2207/20116; G06T 2207/30108; G06T 2207/20016
USPC ................... 382/103, 141–152, 190, 256–265
See application file for complete search history.

(56) References Cited

U.S. PATENT DOCUMENTS

| | | | |
|---|---|---|---|
| 6,539,789 B1 | 4/2003 | Kostka et al. | .................... 73/146 |
| 6,591,669 B1 * | 7/2003 | Serra et al. | ...................... 73/146 |

(Continued)

OTHER PUBLICATIONS

J. Dengler, et al., "Segmentation of Microcalcifications in Mammograms," IEEE Transactions on Medical Imaging, vol. 12, No. 4, Dec. 1993, pp. 634-642.

(Continued)

*Primary Examiner* — Brian Le
(74) *Attorney, Agent, or Firm* — Fitzpatrick, Cella, Harper & Scinto

(57) ABSTRACT

A method of determining relief elements on a tire surface includes capturing a three-dimensional image of the surface and assigning to each pixel (i, j) of the image a grey-level value proportional to a topographic elevation of a point corresponding to the pixel, so as to obtain a starting image ($f$). The method also includes transforming the starting image ($f$) by a first top-hat operation, with aid of a first structuring element, so as to obtain an image ($f_1$) flattened by differencing, ($f_1 = f - \gamma_{3,150}(f)$). The method further includes performing a thresholding operation on the image flattened by differencing, so as to obtain a segmented image, ($T_{<1,30>}(f_1) = seg_1$) in which relief elements appear white on a black background.

12 Claims, 4 Drawing Sheets

(51) Int. Cl.
*G01M 17/02* (2006.01)
*G06T 7/00* (2006.01)

(56) References Cited

U.S. PATENT DOCUMENTS

| | | | |
|---|---|---|---|
| 2005/0259859 A1 | 11/2005 | Hassler et al. | 382/141 |
| 2011/0019903 A1* | 1/2011 | Joly et al. | 382/141 |
| 2013/0202156 A1 | 8/2013 | Joly et al. | 382/104 |
| 2013/0208949 A1 | 8/2013 | Joly et al. | 382/103 |
| 2013/0266189 A1 | 10/2013 | Vinciguerra et al. | 382/104 |
| 2013/0266225 A1 | 10/2013 | Vinciguerra et al. | 382/190 |

OTHER PUBLICATIONS

L. Vincent, "Morphological Grayscale Reconstruction in Image Analysis: Applications and Efficient Algorithms," IEEE Transactions on Image Processing, vol. 2, No. 2, Apr. 1993, pp. 176-201.

* cited by examiner

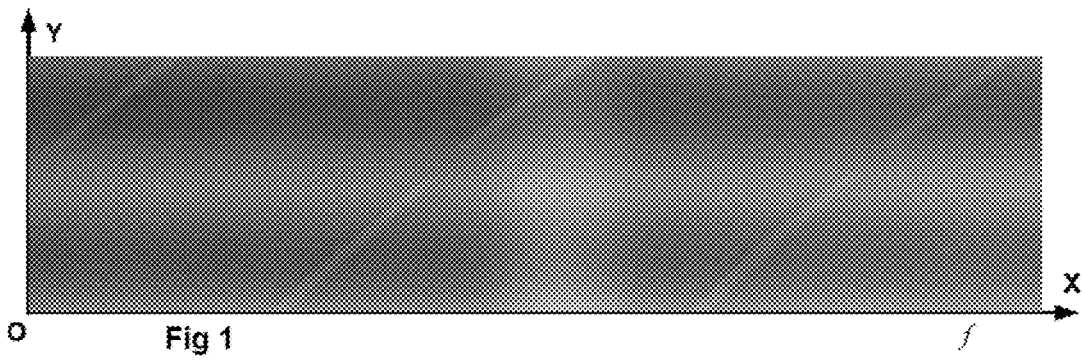
Fig 1
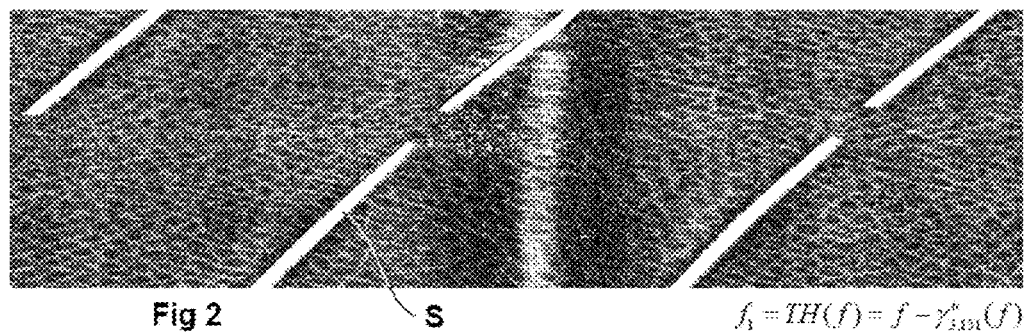
Fig 2    S    $f_1 = TH(f) = f - \gamma^c_{\lambda,\text{lst}}(f)$
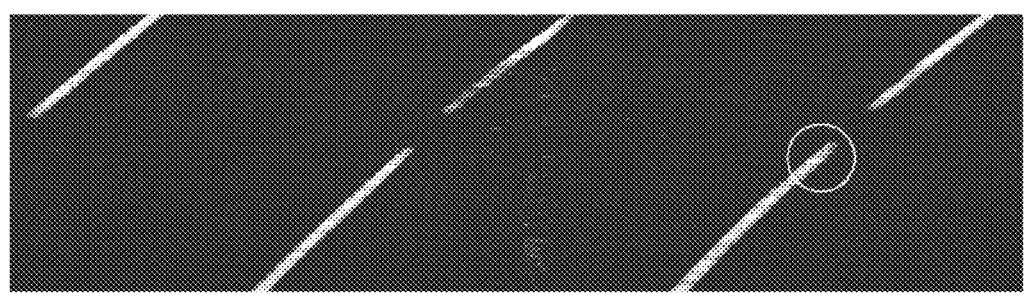
Fig 3    $f_2 = FTH(f_1) = f_1 - [\gamma_{3\text{l,lst}}\phi_{\text{l,lst}}(f_1) \wedge f_1]$
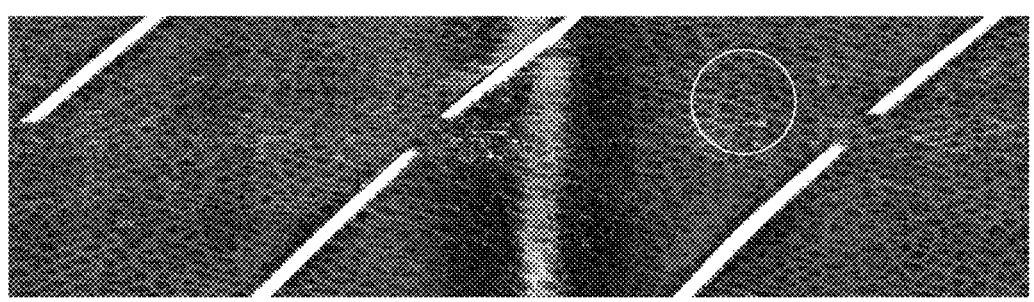
Fig 4    $f_3 = R^d_{f_1}(f_2)$

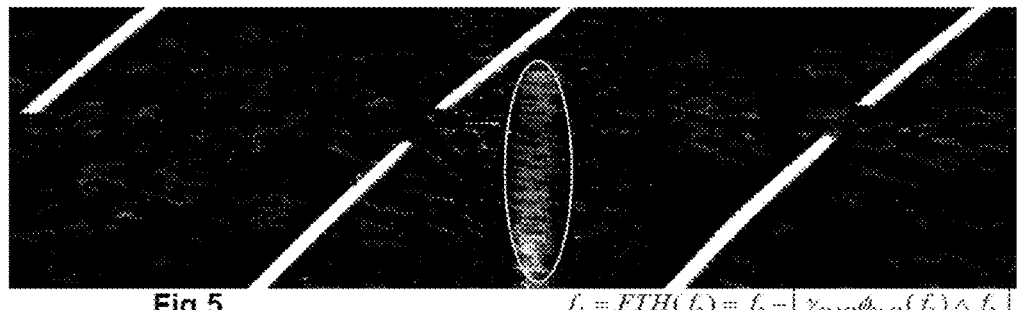
Fig 5 $\quad f_4 = FTH(f_3) = f_3 - [\gamma_{31,51}\phi_{31,51}(f_3) \wedge f_3]$
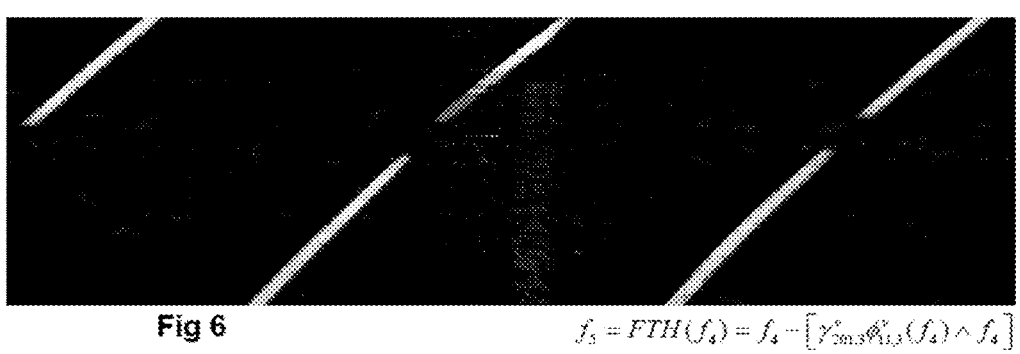
Fig 6 $\quad f_5 = FTH(f_4) = f_4 - [\gamma_{20,3}\phi_{20,3}(f_4) \wedge f_4]$
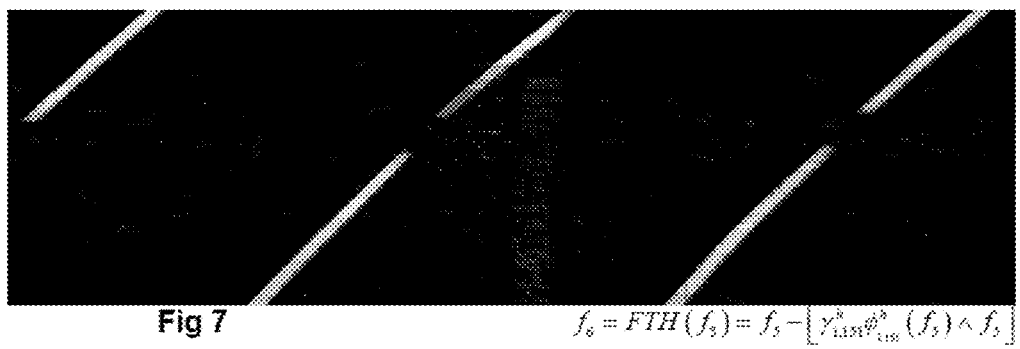
Fig 7 $\quad f_6 = FTH(f_5) = f_5 - [\gamma^b_{1,15}\phi^b_{1,15}(f_5) \wedge f_5]$
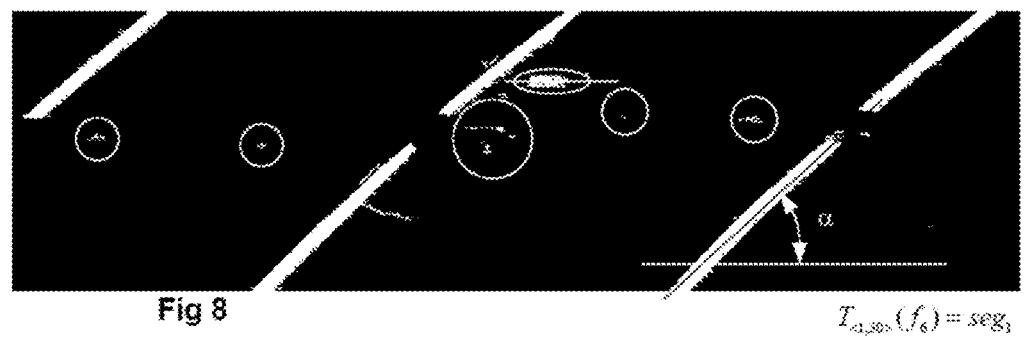
Fig 8 $\quad T_{0,300}(f_6) = seg_3$

METHOD FOR DETERMINING ELEMENTS IN RELIEF ON THE SURFACE OF A TYRE

FIELD OF THE INVENTION

The invention relates to the field of tyre manufacture, and lies more generally within the domain of operations for monitoring the exterior aspect or the interior of tyres during or at the end of the manufacturing process, with the aim of determining compliance thereof with respect to monitoring references.

BACKGROUND

Automatic industrial means of monitoring tyres developed by manufacturers and intended especially to assist operators responsible for visual monitoring, call widely upon image processing techniques.

The methods employed to perform these processings consist, as a general rule, in comparing a two-dimensional or preferably three-dimensional image of the surface of the tyre to be inspected, with a two-dimensional and preferably three-dimensional reference image of the surface of the said tyre.

One of the steps of this process consists, in a known manner, in acquiring the three-dimensional image of the surface of the tyre, with the aid for example, of means based on the principle of optical triangulation, implementing for example a 2D sensor coupled to a lighting source of laser type.

The topographic image of the surface of the tyre is as a general rule a two-dimensional image, termed a grey level image, in which, with any point, i.e. with any pixel (x, y) of the image, is associated a value f(x, y), called the grey level, which represents the altitude of this point with respect to the surface. This grey level value can usefully be coded on 8, or 16 bits or indeed 32 bits for better dynamic range. For coding on 8 bits, the value 255 (white) corresponds to the highest altitude, and the value 0 (black), corresponds to the lowest altitude.

The continuation of the process for analyzing the image obtained then consists, inter alia, in determining the relief elements of the surface to be inspected. This step is particularly significant within the framework of the analysis of the internal part of the tyre in that, the striations or the relief patterns intended to ensure the venting of the air during the cooking of the tyre must be precisely located and identified, so as not to be considered as anomalies of the said surface.

These striations or these relief patterns stand proud by a few tenths of a millimeter from the mean surface of the internal part of the tyre.

BRIEF DESCRIPTION OF EMBODIMENTS OF THE INVENTION

The method according to the object of the invention is to afford a solution to this problem.

This method of extraction of the relief elements featuring on the surface of a tyre relies on regarding the grey level image featuring the reliefs as a black and white image, on which it becomes possible to make ample use of the properties of the morphological operators, after seeing them adapted to the peculiarities of the tyre, in order to extract the information sought.

The morphological operators commonly used are morphological openings and closings, morphological dilations or erosions, using adapted structuring elements.

A structuring element is a set, of appropriate size and shape, used to probe the image studied. It may be seen as a tool which would make it possible to erode (i.e. remove material) or to dilate (i.e. add material) to an image.

Thus, the dilation of the function $f$ (i.e. the grey level image) by a structuring element B, denoted $\delta_B(f)$, is the function which gives at any pixel x∈E the maximum value or in a more general manner the supremum denoted sup, of the image f in the observation window defined by B such that: $\delta_B(f)(x)=\sup\{f(x-y), y\in B\}$.

In the same manner, the erosion of the function $f$ (i.e. the grey level image) by the structuring element B, denoted $\epsilon_B(f)$, is the function which gives at any pixel X∈E the minimum value, or in a more general manner the infimum denoted inf, of the image f in the observation window defined by B: $\epsilon_B(f)(x)=\inf\{f(x-y), y\in B\}$.

A morphological opening by addition $\gamma_B$ is defined as the composition of an erosion $\epsilon_B$ with a dilation $\delta_B$ for a structuring element B, such that: $\gamma_B(f)=\epsilon_B \cdot \delta_B(f)$. Conversely, a morphological closing $\phi_B$ is defined as the composition of a dilation $\delta_B$ with an erosion $\epsilon_B$ for a structuring element B, such that: $\phi_B(f)=\epsilon_B \cdot \delta_B(f)$.

The operation which consists in taking the difference between an image f and the transform of this image by morphological opening $\gamma_B$ with the aid of a structuring element B, also known by the name top-hat by opening, is denoted $TH_B(f)=f-\gamma_B(f)$. The effect of this morphological operator is to extract the spikes, but does not make it possible to eliminate the very localized spikes that may be regarded as noise.

Hence, it may turn out to be useful to filter the image by choosing for each pixel the minimum value, or infimum, denoted ^, between the composition of a morphological opening and of a morphological closing of the image f with the aid of the structuring elements B1 and B2, $\gamma_{B1}(\phi_{B2}(f))$, and the value of this pixel in the starting image $f$. This operation is denoted $\gamma_{B1}(\phi_{B2}(f)) \wedge (f)$.

The morphological operation named top-hat by opening with filtering is then defined, which combines the previous operators, and which is denoted FTH $(f)=f-((\gamma_{B2}(\phi_{B2}(f))) \wedge f)$. This morphological operation makes it possible to extract the spikes and to filter the abnormal values corresponding to the localized spikes.

Geodesic dilation, the object of which is to reconstruct a mask, consists for a discrete pattern Y of the image acting as marker, included in a discrete pattern X of the same image, in enlarging the said element Y with the aid of a structuring element B, just considering only the part of Y at the increased size included in the mask X. Unit dilation is defined by $\delta_X(Y)=\delta_B(Y) \cap X$.

The effect of the iterative application of this dilation operation up to idempotence is to reconstruct the mask X without modifying its shape. This morphological reconstruction operator which makes it possible to preserve in a starting image only those elements alone which are identified on the basis of markers Y, is denoted $R_X^\delta(Y)=\delta_X^\infty(Y)=\delta_X^n(Y)$, such that $\delta_x^n(y)=\delta_x^{n+1}(y)$ with $\delta_x^1(y)=\delta_x^1 \delta_x^1 \ldots \delta_x^1(y)$ (n pois) the geodesic dilation of size n, and $\delta_x^1(y)=\delta_B(y) \cap X$ the unit geodesic dilation.

Finally, the thresholding operation consists in transforming an image so that, for each pixel, the maximum grey level value (corresponding to the colour white) is allocated if the grey level value of this pixel lies between two given threshold values [$u_1$, $u_2$], and to the value zero (corresponding to the colour black) in the converse case. This operation is denoted $$T_{[u_1,u_2]}(f(x)) = \begin{cases} 256 & \text{if } u_1 \leq f(x) \leq u_2 \\ 0 & \text{otherwise} \end{cases}.$$

As a general rule $u_1$ is equal to zero and the value of the threshold is given by $u_2$. In a complementary manner, to obtain a more robust thresholding, the operation of thresholding by hysteresis, denoted $T_{<sin\ f,ssup>}$, is a thresholding followed by a reconstruction of the segmentation with the lowest threshold sin f on the basis of the segmentation with the highest threshold ssup.

The method according to the invention envisages the steps in the course of which:

A—the three-dimensional image of the said surface is captured while assigning to each pixel (i, j) of the image a grey level value proportional to the topographic elevation of this point, so as to obtain a starting image, B—with the aid of a structuring element, the starting image is transformed by a first top-hat, so as to obtain an image flattened by differencing, C—with the aid of a first and of a second structuring element, the image flattened by differencing is transformed by a second top-hat with filtering so as to obtain a filtered image acting as marker, and the image flattened by differencing is reconstructed on the basis of the markers contained in the filtered image so as to form a reconstructed filtered image.

D—with the aid of structuring elements of given sizes, shapes and orientation, the reconstructed filtered image is transformed successively by a series of top-hat with filtering so as to obtain a series of filtered flattened images, E—a thresholding of the image flattened by differencing is carried out, so as to obtain a segmented image, so that the relief elements appear white on a black background.

Prior to step B, to facilitate the calculations, it is advantageous to unfold the image of the surface in an orthogonal reference frame in which the abscissa axis represents the circumferential values, and the ordinate axis represents the radial values.

The size and the shape of the structuring element serving to carry out the first top-hat of step B can advantageously have a linear shape or have the shape of a rectangle, and whose size is chosen so that the length of the linear structuring element or the large side of the rectangle, oriented in the circumferential direction, comprises a number of pixels corresponding to a length lying between 4 and 15 mm, and that the small side of the rectangle comprises a number of pixels corresponding to a length lying between 0.1 mm and 0.3 mm.

In the course of step C:
the first structuring element used for the morphological closing operation has the shape of a rectangle, whose size is chosen so that the large side of the rectangle, oriented in the circumferential sense, comprises a number of pixels corresponding to a length lying between 1 and 5 mm, and that the small side of the rectangle comprises a number of pixels corresponding to a length lying between 1 and 2 mm, and the second structuring element used for the morphological opening operation also has the shape of a rectangle, whose size is chosen so that the large side of the rectangle, oriented in the circumferential sense, comprises a number of pixels corresponding to a length lying between 4 and 15 mm, and that the small side of the rectangle comprises a number of pixels corresponding to a length lying between 1 mm and 2 mm.

In the course of step D, it is advantageously possible to perform the thresholding of the grey level by choosing a threshold value corresponding to a height variation of greater than or equal to 0.15 mm.

In the course of this step D, the size of the structuring elements is advantageously chosen so that the small side of the rectangle comprises a number of pixels corresponding to a length lying between 0.03 mm and 2 mm, and that the large side of the rectangle or the length of the structuring element comprises a number of pixels corresponding to a length lying between 0.3 mm and 10 mm.

The structuring elements used in the course of step E for these successive operations advantageously have a linear shape or the shape of a rectangle, and can be oriented in the circumferential or radial direction.

Advantageously, on completion of step E, it is possible to define shape factors of the elements appearing in white on the segmented image.

Advantageously, only the objects whose shape factors correspond to predetermined values are preserved.

Advantageously, the shape factors are the principal angular orientation of the shape, and/or the area of the shape, and/or the eccentricity of an ellipse encompassing the said shape.

To avoid discontinuities related to the deradialization of the image, prior to the search for the shape factors, it is advantageously possible to circumferentially increase the segmented image by an overlap zone corresponding to an angular sector of predefined length and starting from the origin (O).

The method according to the invention applies advantageously to the interior surface of the tyre, so that the relief elements are striations.

BRIEF DESCRIPTION OF THE DRAWINGS

The object of the description which follows is to give the detailed indications on the implementation of the method, and relies on FIGS. 1 to 10, in which:

FIG. 1 represents a two-dimensional grey level image of the internal topographic surface of a tyre, FIG. 2 represents the same image after a first top-hat, FIG. 3 represents the image of FIG. 2 after a second top-hat with filtering, FIG. 4 represents the image of FIG. 3 after reconstruction, FIG. 5 represents the image of FIG. 4 after a top-hat with filtering, FIG. 6 represents the image of FIG. 5 after a top-hat with filtering with the aid of structuring elements oriented substantially in the radial direction, FIG. 7 represents the image of FIG. 6 after a top-hat with filtering with the aid of structuring elements oriented substantially in the circumferential direction, FIG. 8 represents the image of FIG. 7 after thresholding.

DETAILED DESCRIPTION OF EMBODIMENTS OF THE INVENTION

Figure 9:
FIG. 9 represents the image of FIG. 8 after elimination of the elements whose shape factor is not included in the predetermined limits.

The image of FIG. 1 represents a partial view of the image of the internal part of a tyre. This image is obtained with the aid of a means calling upon technologies known per se, such as laser triangulation.

As a general rule, the two-dimensional image of the topographic surface of a tyre is a grey level image of the relief, such as represented in FIG. 1, in which, with any point or pixel x=(i, j) of the plane (E=[1, 2, ... ]×[1, 2, ... ], with $E \subset \square^2$) represented in the form of a point grid (that is to say a 2D array), is associated a value $f(x) \subset T$ with $T \subset \square$. Generally, T consists of integer values lying between 0 and 255. The value 0 corresponds to the colour black, and the value 255 corresponds to the colour white.

For a car tyre of standard dimension the image is calibrated in such a way that the variation of a grey level unit corresponds to a height of about 0.01 mm.

The number of pixels of the image naturally depends on the choice of the camera used, and the mode of input, but it is commonplace to produce images comprising 40 000×5000 pixels to represent the whole of the interior surface of the tyre.

For calculation convenience reasons, the polar coordinates of the circular image of the sidewall of the tyre are transformed into orthogonal coordinates. The image of FIG. 1 is represented in the said orthogonal reference frame, in which the abscissa axis OX represents the circumferential values, and the ordinate axis OY represents the radial values.

The object of the invention is to emphasize the relief elements present on the surface of a tyre. Although it is possible to implement the method according to the invention on most zones of the surface of the tyre, the present description is more particularly concerned with the processing of the image of the interior of the tyre and, in this instance, with the detection of the striations present on the said interior surface.

The method according to the invention, as has already been mentioned, proposes to carry out transformations of the image with the aid of morphological operators, regarding the variations of height, i.e. the reliefs, as variations of grey level.

The first morphological operator used is a top-hat with the aid of an essentially circumferential structuring element, so as to delete the camber of the sidewall here regarded as the geometry of the sidewall in a radial plane. The resulting image, $f_1 = f - \gamma_{3,151}(f)$ is illustrated in FIG. 2. This image represents a flattened interior view of the tyre in which the striations S, which are in relief with respect to the internal surface, appear white in colour.

The size and the shape of the structuring element are adapted to retain only the reliefs corresponding to striations, whose width in the circumferential sense does not exceed a few millimeters. A structuring element having the shape of a rectangle will be adopted, whose large side is oriented in the circumferential direction, and whose size is chosen so that the small side of the rectangle comprises a number of pixels corresponding to a length lying between 0.1 mm and 0.3 mm and that the large side of the rectangle comprises a number of pixels corresponding to a length lying between 4 mm and 15 mm. For greater precision, it would be possible to choose a linear structuring element, oriented in the circumferential direction, of the same size as the large side of the rectangle. In this instance, it is a rectangle of 3×151 pixels which is adopted.

For convenience, an odd number of pixels will preferably be chosen so as to better centre the structuring element on the pixel to be analysed.

It is possible, right from this stage of the implementation of the method according to the invention, to extract the said striations from the image by performing a thresholding by hysteresis $T_{<1,30>}(f_1) = seg_1$, so as to obtain the sought-after segmented image in which the striations appear white on a black background.

In the case of a tyre of standard dimension, by considering that the striations have a mean height of 0.8 mm, the grey level threshold, corresponds to a height variation of greater than or equal to 0.15 mm i.e., a variation of some fifteen or so grey levels.

However, it is observed that the image of the interior surface is apt to exhibit irregularities that need to be filtered so as to obtain a final segmented image revealing only the relief elements sought. These irregularities originate for example, from the abnormal spikes introduced during the production of the image, the circumferential variation of the camber, localized bumps or depressions caused by the effects of the moulding of the sculptures and known as denting, or else from the localized presence of thickenings originating from the internal junctions of products.

Hence, it may turn out to be particularly beneficial to filter these irregularities with the aid of morphological operators adapted to the size and to the preferential location of these irregularities on the internal surface of the tyre.

A first operation can consist in filtering the localized noise of reduced size but of large amplitude.

Accordingly, the image flattened by differencing, $f_1$, will be transformed with the aid of a second top-hat with filtering, $f_2 = FTH(f_1) = f_1 - ((\gamma_{31,151}(\phi_{31,51}(f_1))) \wedge f_1)$. It is observed, in the resulting image reproduced in FIG. 3, that the isolated anomalies have been deleted, and that the striations appear clearly.

In this instance, a structuring element of rectangular shape is chosen, whose size corresponds to the size of the anomalies that it is sought to filter.

For the morphological closing operation, use will be made of a first structuring element whose large side is oriented in the circumferential sense, corresponding to the axis OX, and whose size is chosen so that the small side of the rectangle comprises a number of pixels corresponding to a length lying between 1 mm and 2 mm, and that the large side of the rectangle comprises a number of pixels corresponding to a length lying between 1 mm and 5 mm. In this instance, a rectangle of about 30×50 pixel gives good results.

For the morphological opening operation, use will be made of a second structuring element whose large side is oriented in the circumferential sense, corresponding to the axis OY, and whose size is chosen so that the small side of the rectangle comprises a number of pixels corresponding to a length lying between 1 and 2 mm, and that the large side of the rectangle comprises a number of pixels corresponding to a length lying between 4 mm and 15 mm. In this instance serving as support to the present description, it is a rectangle of about 30×150 pixels which has been adopted.

It is observed, however, that the edges and the ends of the striations have been partially expunged. These alterations are surrounded by a white roundel in FIG. 3.

Use is then made of the structures remaining in the image $f_2$ as marker to reconstruct the structures of interest of the image $f_1$, by reconstructing the image $f_1$ with the aid of the morphological operator of the same name. The resulting image, $f_3 = R_{f_1}^{\delta}(f_2)$, is reproduced in FIG. 4.

Consecutively to the reconstruction operation described hereinabove, it is usefully possible to apply a series of additional filters so as to eliminate the bumps and the depressions previously mentioned.

In a manner similar to the operations already described, the image is transformed successively with the aid of top-hat with filtering by adapting the structuring elements to the shape of the objects sought.

By way of example, it may be desired to eliminate the patterns surrounded by a white roundel in FIG. 4.

These patterns have the general shape of superficial blotches and are in light relief with respect to the interior surface. The function of this superficial cellular network is, during cooking, to vent the air inclusions towards the striations. Although random, the shape of the cells is fairly regular. The size and the shape of the structuring elements used for the morphological closing and opening operations will be chosen accordingly. Although a circular or ellipsoidal shape may be equally suitable, provided that the said shape has a surface able to cover all shapes of pits, a choice of convenience will be structuring elements of rectangular shape whose large side is oriented in the circumferential direction.

In the example serving as support to the present description:

the size of the structuring element used for the morphological closing operation is chosen so that the small side of the rectangle comprises a number of pixels corresponding to a length lying between 1 and 2 mm, and that the large side of the rectangle comprises a number of pixels corresponding to a length lying between 1.5 mm and 3 mm is, in this instance a rectangle of 31×51 pixels, and the size of the structuring element used for the morphological opening operation is chosen so that the small side of the rectangle comprises a number of pixels corresponding to a length lying between 1 mm and 2 mm, and that the large side of the rectangle comprises a number of pixels corresponding to a length lying between 4 mm and 15 mm is, in this instance a rectangle of 31×151 pixels.

The resulting image, $f_4 = \text{FTH}(f_3) = f_3 - ((\gamma^h_{31,151}(f_3))) \wedge f_3)$, is reproduced in FIG. 5.

This image also reveals a radial trace, surrounded by an ellipse, and originating from a localized irregularity engendered by a junction of products.

In the same manner as previously, a new processing of the image by top-hat with filtering is undertaken, adapting the size and the shape of the structuring elements to the element that it is desired to extract or to those that it is desired to delete. To lessen the calculation times, structuring elements of rectangular or linear shape will be chosen.

In the example serving as support to the present description:

the structuring element used for the morphological closing operation has its large side oriented in the radial sense, i.e. along the axis OY, and its size is chosen so that the small side of the rectangle comprises a number of pixels corresponding to a length lying between 0.1 mm and 0.3 mm, and that the large side of the rectangle comprises a number of pixels corresponding to a length lying between 0.3 mm and 1 mm i.e., in this instance, a rectangle of 11×3 pixels, and the structuring element used for the morphological opening operation also has its large side oriented in the radial sense, and its size is chosen so that the small side of the rectangle comprises a number of pixels corresponding to a length lying between 0.1 mm and 0.3 mm, and that the large side of the rectangle comprises a number of pixels corresponding to a length lying between 5 and 15 mm i.e., in this instance, a rectangle of 200×3 pixels.

Linear structuring elements, oriented in the radial direction and of length corresponding to the large sides of the rectangles hereinabove could be equally suitable.

The resulting image from this morphological transformation, $f_5 = \text{FTH}(f_4) = f_4 - ((\gamma^v_{201,3}(\phi^v_{11,3}(f_4))) \wedge f_4)$ is reproduced in FIG. 6. The radial streak has been substantially attenuated.

Still with the same intent, it is also possible to filter the image with the aid of a top-hat so as to delete the residual of the radial camber. The structuring elements have a rectangular or linear shape.

In this instance, linear structuring elements oriented in the circumferential direction are chosen:

the structuring element used for the morphological closing operation comprises a number of pixels corresponding to a length lying between 4 and 10 mm i.e., in this instance, a segment of 50 pixels and the structuring element used for the morphological opening operation comprises a number of pixels corresponding to a length lying between 4 and 15 mm i.e. in this instance a segment of 150 pixels.

The resulting image, $f_6 = \text{FTH}(f_5) = f_5 - ((\gamma^h_{1,151}(\phi^v_{1,151}(f_5))) \wedge f_5)$ is reproduced in FIG. 7.

The number of top-hat with filtering is not limiting and must be adapted to the elements that it is desired to extract from the image. In the case serving as support to the present description three successive filtering operations have been undertaken.

The operation of segmentation by thresholding by hysteresis of the filtered image $f_6$, $T_{<1,30>}(f_6) = \text{seg}_6$, is then undertaken, the result of which is reproduced in FIG. 8. The grey level threshold has a value identical to the value previously adopted and corresponds to a height variation of greater than or equal to 0.15 mm i.e., a variation of some fifteen or so grey levels.

The resulting image of FIG. 8 reveals in white on a black background the relief patterns sought, in the present case the striations. It is observed that elements surrounded by a circle and which do not correspond to the striations sought still remain.

The method according to the invention then proposes to undertake an additional filtering operation to extract these undesirable elements, based on the fact that the elements sought have the different shape factors from the shape factors of the elements that it is desired to eliminate. It is indeed noted, in this instance, that the striations have an elongate shape and make a relatively constant and known given angle with the circumferential direction.

To evaluate these shape factors it is for example possible to seek to include each of these shapes in an encompassing ellipse as is illustrated in FIG. 8.

The angle $\alpha$ is then determined, formed by the major axis of the encompassing ellipse with the circumferential direction, i.e. the axis OX, which represents the principal direction of the striation, and only the shapes for which this angle lies within predetermined limits are retained.

It is also possible, and in a supplementary manner, to calculate the eccentricity of the encompassing ellipse and consider that the striations, of elongate shape, have an eccentricity greater than a given threshold. The elements which do not meet this criterion are thus excluded.

It is also possible to calculate the surface area of the element featuring in white on the segmented image, and to extract all the elements which do not have an area greater than a given threshold.

To perform these operations on the shapes, it is important to modify the image to be processed so as to take account of the circularity of the representation; namely that, in the chosen reference frame, the extreme edge of the image in the circumferential direction corresponds to the edge of the image of zero abscissa, increased by a rotation of $2\pi$. Accordingly, an image is formed, composed of the zones of overlap of the two sides of the circumferential end of the image; this new image is denoted $\text{seg}^{overlap}$.

During deletion of the elements not corresponding to the desired criteria, the overlap zone, $seg^{overlap}$, is managed in a distinct manner, by modifying certain thresholds such as the calculation of the minimum area, so as not to exclude a striation part appearing at both ends of the image and whose area would be cut in two.

FIG. 9 reproduces the image obtained after application of the latter processing, and in which, only the striations remain, whereas all the undesirable elements have been deleted.

Figure 10:
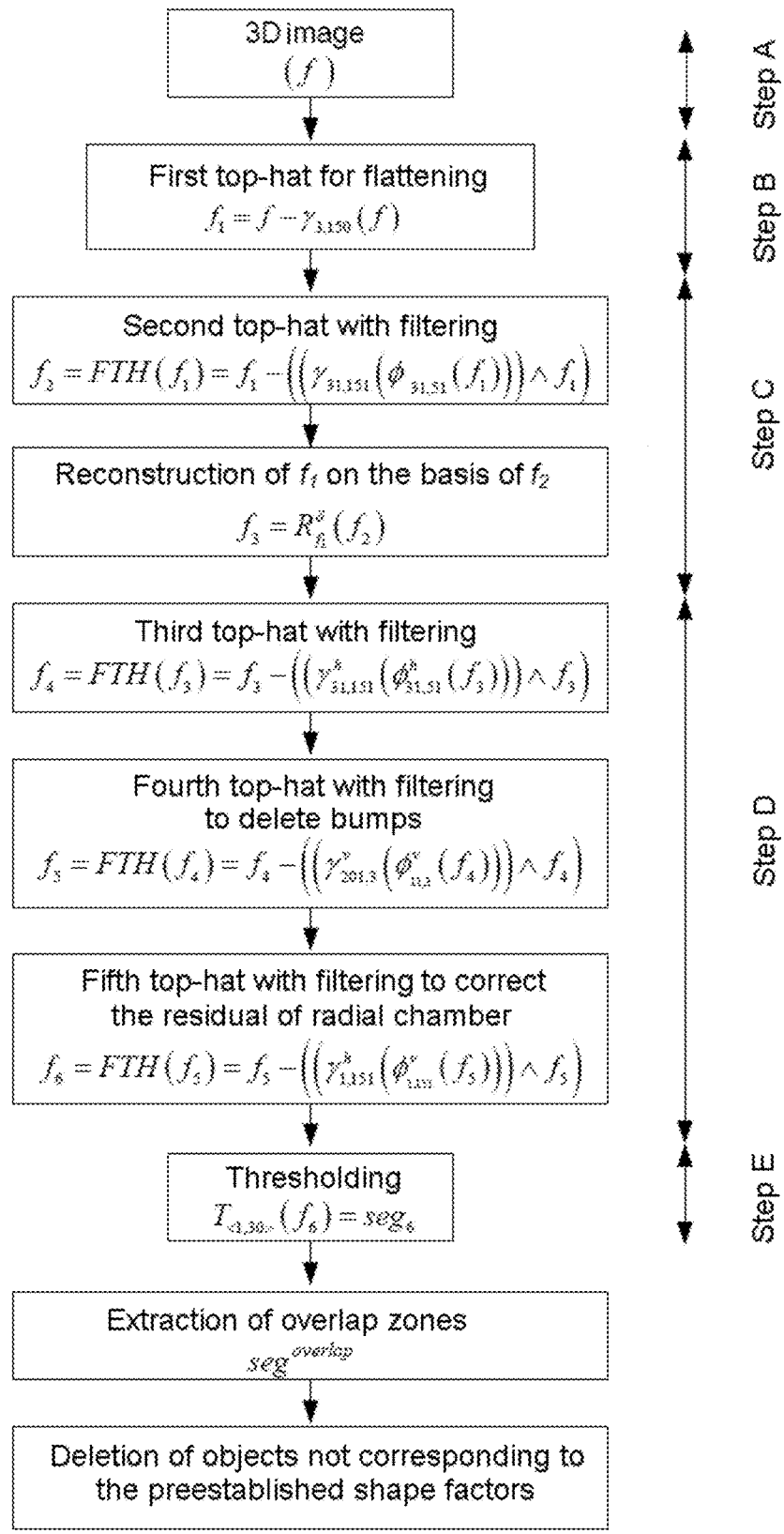
FIG. 10 represents a functional chart of the processing of the starting image according to the invention.

FIG. 10, illustrates in a summary manner, the implementation steps of the invention in the case of the example serving as support to the present description.

It then becomes possible to extract the patterns and to undertake the subsequent processings of the image with a view to determining the compliance of the tyre.

The exemplary implementation of the method according to the invention is not limiting and will be able to be adapted according to the indications given so as to address the analysis of tyres of varied sizes and use while taking into account the peculiarities of the relief patterns that it is sought to extract and of those that it is sought to eliminate.

The invention claimed is:

1. A method of extracting, from an image, relief elements featured on a surface of a tyre, the method comprising steps of:
   assigning, to each pixel (i, j) of a three-dimensional image of the surface, a grey-level value proportional to a topographic elevation of a point corresponding to the pixel, so as to obtain a starting image (f);
   using a structuring element to transform the starting image (f) by a first top-hat operation, so as to obtain an image ($f_1$) flattened by differencing, ($f_1 = f - \gamma_{3,151}(f)$);
   using first and second structuring elements to transform the image flattened by differencing ($f_1$) by a second top-hat with filtering operation, so as to obtain a filtered image acting as marker ($f_2 = FTH(f_1) = f_1 - ((\gamma_{31,151}(\phi_{31,51}(f_1))) \wedge f_1)$)
   reconstructing the image flattened by differencing based on markers contained in the filtered image, so as to form a reconstructed filtered image ($f_3 = R^\delta_{f1}(f_2)$);
   using structuring elements of given sizes, shapes, and orientations to transform the reconstructed filtered image successively by a series of top-hat with filtering operations, so as to obtain a series of filtered flattened images ($f4 = FTH(f_3)$, $f_5 = FTH(f_4)$, $f_6 = FTH(f_5)$); and
   performing a thresholding operation on a last image ($f_6$) of the series of filtered flattened images, so as to obtain a segmented image ($T_{<1,30>}(f_6) = seg_1$) in which relief elements of a first color appear on a background of a second color.

2. The method according to claim 1, wherein, prior to the step of using a structuring element to transform the starting image, the three-dimensional image of the surface is unfolded in an orthogonal reference frame (OXY) in which an abscissa axis (OX) represents circumferential values and in which an ordinate axis (OY) represents radial values.

3. The method according to claim 1, wherein the structuring element used to transform the starting image is a linear structuring element or has a shape of a rectangle, in which a size is chosen so that a length of the linear structuring element or a long side of the rectangle, oriented in a circumferential direction, includes a number of pixels corresponding to a length lying between 4 mm and 15 mm, and so that a short side of the rectangle includes a number of pixels corresponding to a length lying between 0.1 mm and 0.3 mm.

4. The method according to claim 1, wherein:
   the first structuring element is used for a morphological closing operation and has a shape of a rectangle, whose size is chosen so that a long side of the rectangle, oriented in a circumferential direction, includes a number of pixels corresponding to a length lying between 1 mm and 5 mm, and so that a short side of the rectangle includes a number of pixels corresponding to a length lying between 1 mm and 2 mm, and
   the second structuring element is used for a morphological opening operation and has a shape of a rectangle, whose size is chosen so that a long side of the rectangle, oriented in the circumferential direction, includes a number of pixels corresponding to a length lying between 4 mm and 15 mm, and so that a small side of the rectangle includes a number of pixels corresponding to a length lying between 1 mm and 2 mm.

5. The method according to claim 1, wherein the structuring elements used to transform the reconstructed filtered image are linear structuring elements or have a shape of a rectangle, and are oriented in a circumferential direction or a radial direction.

6. The method according to claim 5, wherein a size of the structuring elements is chosen so that a short side of the rectangle includes a number of pixels corresponding to a length lying between 0.1 mm and 2 mm, and so that a long side of the rectangle, or a length of the linear structuring elements, includes a number of pixels corresponding to a length lying between 0.3 mm and 15 mm.

7. The method according to claim 1, wherein, in the step of performing the thresholding operation on the last image of the series of filtered flattened images, thresholding of a grey level corresponding to a height variation of greater than or equal to 0.15 mm is performed.

8. The method according to claim 1, wherein, on completion of the step of performing the thresholding operation on the last image of the series of filtered flattened images, shape factors of elements of the first color appearing on the segmented image are defined.

9. The method according to claim 8, wherein only objects whose shape factors correspond to predetermined values are preserved.

10. The method of according to claim 9, wherein the shape factors include any one or a combination of:
    a principal angular orientation ($\alpha$) of a shape,
    an area of the shape, and
    an eccentricity of an ellipse encompassing the shape.

11. The method of according to claim 8, wherein, prior to searching for objects corresponding to the shape factors, the segmented image is circumferentially increased by an overlap zone ($seg^{overlap}$) corresponding to an angular sector of predefined length and starting from an origin (O).

12. The method according to claim 1,
   wherein the surface of the method is an interior surface of the tyre, and
   wherein the relief elements are striations.

* * * * *

UNITED STATES PATENT AND TRADEMARK OFFICE
CERTIFICATE OF CORRECTION

PATENT NO. : 9,002,130 B2
APPLICATION NO. : 14/118598
DATED : April 7, 2015
INVENTOR(S) : Guillaume Noyel et al.

It is certified that error appears in the above-identified patent and that said Letters Patent is hereby corrected as shown below:

In the Specification

COLUMN 2

Line 19, "$\gamma_B(f)=\epsilon_B \cdot \delta_B(f).$" should read --$\gamma_B(f)=\delta_B \cdot \epsilon_B(f).$--;
Line 24, "image f" should read --image $f$--;
Line 32, "denoted ^," should read --denoted ^,--;
Line 34, "image f" should read --image $f$--;
Line 37, "$\gamma_{B1}(\varphi_{B2}(f)) \wedge (f).$" should read --$\gamma_{B1}(\varphi_{B2}(f))) \wedge (f).$--; and
Line 59, "$\delta_x^1(y)=\delta_x^1 \delta_x^1 \ldots \delta_x^1(y)$" should read --$\delta_x^n(y)=\delta_x^1 \delta_x^1 \ldots \delta_x^1(y)$--.

COLUMN 3

Line 9, "$T_{<\sin f, \text{ssup}>}$," should read --$T_{<\sin f, \text{ssup}>}$,--.

COLUMN 5

Line 63, "$T_{<1,30>}(f_1)=\text{seg}_1$," should read --$T_{<1,30>}(f_1)=\text{seg}_1$,--.

COLUMN 7

Line 31, "$(f_3)))\wedge f_3)$," should read --$(\varphi^h_{31,51}(f_3)))\wedge f_3)$,--.

In the Claims

COLUMN 9

Line 37, "$(f_1)))\wedge f_1))$" should read --$(f_1)))\wedge f_1))$;--.

Signed and Sealed this
First Day of September, 2015

Michelle K. Lee
*Director of the United States Patent and Trademark Office*

CERTIFICATE OF CORRECTION (continued)
U.S. Pat. No. 9,002,130 B2

COLUMN 10

Line 47, "of according" should read --according--;
Line 52, "of according" should read --according--; and
Line 55, "sef$^{overlap}$)" should read --(seg$^{overlap}$)--.